No. 750,235. PATENTED JAN. 19, 1904.
W. G. TOUSEY.
FILTER TABLET.
APPLICATION FILED JUNE 8, 1903.
NO MODEL.
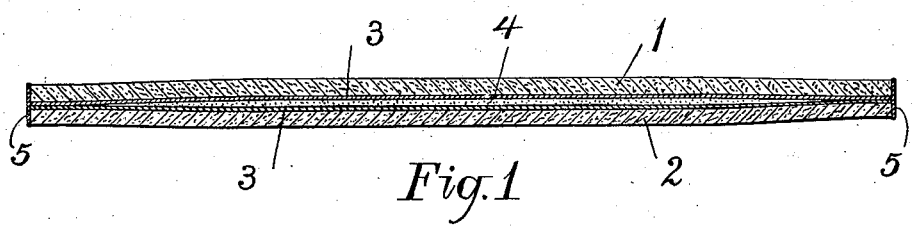
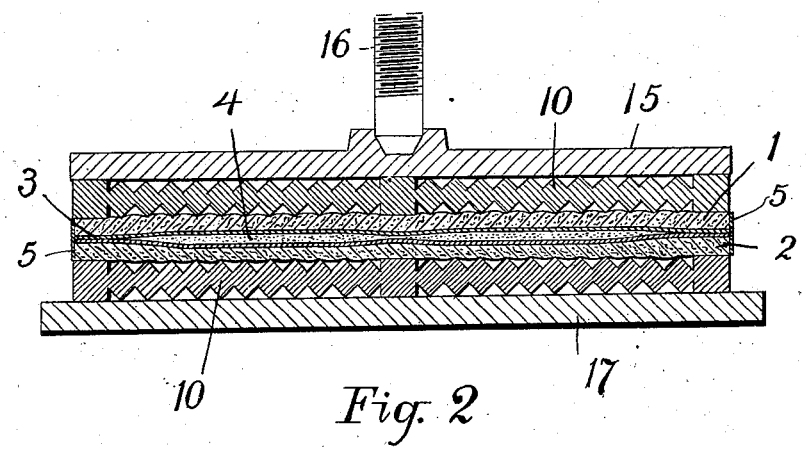
Witnesses;
W. L. Goodrich
M. W. Upham
Inventor,
William G. Tousey;
By A. B. Upham,
His Attorney.

No. 750,235. Patented January 19, 1904.

UNITED STATES PATENT OFFICE.

WILLIAM G. TOUSEY, OF SOMERVILLE, MASSACHUSETTS.

FILTER-TABLET.

SPECIFICATION forming part of Letters Patent No. 750,235, dated January 19, 1904.

Original application filed December 23, 1902, Serial No. 136,349. Divided and this application filed June 8, 1903. Serial No. 160,479. (No model.)

*To all whom it may concern:*

Be it known that I, WILLIAM G. TOUSEY, a citizen of the United States, and a resident of Somerville, in the county of Middlesex, State of Massachusetts, have invented certain new and useful Improvements in Filter-Tablets, of which the following is a full, clear, and exact description.

This invention relates to the form of filter specifically designed for the water-filter set forth in my companion application, filed December 23, 1902, Serial No. 136,349, this application being a division of said application.

Referring to the drawings forming part of this specification, Figure 1 is a diametrical sectional view of my filter-tablet. Fig. 2 is a similar section of said tablet, showing it compressed between the disks of the form set forth in my said companion application.

The filter-tablet forming the subject-matter of this application is an improvement over the one set forth in my Patent No. 634,512, which discloses a tablet of fibrous material impregnated with aluminium hydroxid or similar salt. In place of the single layer of fibrous material I now employ a plurality of such layers, as 1 and 2, (shown in the drawings,) and apply the aluminium hydroxid to the inner surfaces of such layers, as at 3.

My second improvement is to coat the peripheral edges of the filter-tablet with an insoluble substance, a varnish, 5, in order that no water can exude radially from the edges of the filter, but must all pass through the outlet provided therefor, as shown in my said companion application.

My third improvement consists in filling the space between the two or more tablet layers with pulverized charcoal 4 or other special filtering materials.

My fourth improvement consists in providing means for compressing the entire filter-tablet, and so by the compressed condition of its fibers its action as a filter is substantially improved.

As shown in Fig. 2, the means for compressing the tablet fibers consist of the disks 10, having their annular ribs pressing in the sides of the tablet, and the charcoal filling 4 serving by its unyielding character to keep the tablet layers out against said ribs.

By my improvements several decided advantages are obtained. For example, first, the enameled or coated surfaces 3 are protected from injury during handling; second, a fibrous untreated surface of the tablet is always presented to the unfiltered water to act as a relatively coarse filter medium, protecting the more refined filtering medium within from too speedy clogging and, moreover, economizing the special virtues of the latter; third, this double-layer tablet prevents the aluminium hydroxid or whatever other filtering material may be included between the two parts thereof from being carried away bodily by the current whichever direction is given thereto; fourth, the double layer also permits of the safe inclusion not only of the finely-powdered charcoal referred to, but of whatever other substance may be desired capable of some specific chemical effect.

In Fig. 2 I show the filter-tablet and disks 10 as pressed between the clamping-plates 15 17 by the screw 16 engaging the upper one thereof.

In addition to the compression of the tablet fibers above referred to the entire filtering media is equally acted upon, including the powdered charcoal between the tablet layers.

The varnish applied to the edges of the tablet not only serves to cement the several layers together and to prevent lateral exudation of the water, but by its impregnation of the fibers for a short distance it so stiffens and strengthens the edge of the tablet as to enable it to be handled without danger of injury. This is a very important point, inasmuch as when the tablets are wet they become very tender and their edges are easily broken and torn when unprotected with such unaffected and strengthened border.

What I claim as my invention, and for which I desire Letters Patent, is as follows, to wit:

1. A filter-tablet composed of a plurality of layers of porous material secured together and having aluminium hydroxid, or similar salt, upon their inner faces, substantially as described.

2. A filter-tablet composed of a plurality of layers of porous material secured together and having aluminium hydroxid or similar salt, impregnated in their inner faces, substantially as described.

3. A filter-tablet composed of a plurality of layers of fibrous material secured together at their edges and having their inner faces coated with aluminium hydroxid, or similar substance, substantially as described.

4. A filter-tablet composed of a plurality of layers of fibrous material peripherally secured together by an insoluble cement inclosing their edges, and having a filtering material between them, substantially as described.

5. A filter-tablet of fibrous material having its peripheral edges stiffened and strengthened by an insoluble size or varnish, substantially as described.

6. A filter-tablet composed of a plurality of layers of fibrous material peripherally united, inclosing powdered charcoal, and coated with aluminium hydroxid upon their inner faces, substantially as described.

7. A filter-tablet composed of a plurality of layers of fibrous material having their peripheral edges covered by an insoluble coating, inclosing powdered charcoal, and having their inner faces coated with aluminium hydroxid, or similar salt, substantially as described.

8. A porous filtering-tablet having aluminium hydroxid and powdered charcoal secured to a face thereof, substantially as described.

9. A filter-tablet composed of a plurality of layers of fibrous material having aluminium hydroxid and pulverized charcoal between them, substantially as described.

In testimony that I claim the foregoing invention I have hereunto set my hand this 4th day of June, 1903.

WILLIAM G. TOUSEY.

Witnesses:
A. B. UPHAM,
W. L. GOODRICH.